US011093360B2

(12) United States Patent
 Garion et al.

(10) Patent No.: US 11,093,360 B2
(45) Date of Patent: Aug. 17, 2021

(54) MULTIVARIATE ANOMALY DETECTION AND IDENTIFICATION

(71) Applicant: International Business Machines Corporation, Armonk, NY (US)

(72) Inventors: Shelly-Erika Garion, Haifa (IL); Elliot Karl Kolodner, Haifa (IL); Anna Levin, Haifa (IL); Nimrod Megiddo, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 22 days.

(21) Appl. No.: 16/520,377

(22) Filed: Jul. 24, 2019

(65) Prior Publication Data

US 2021/0026747 A1    Jan. 28, 2021

(51) Int. Cl.
*H04L 29/08* (2006.01)
*H04L 12/26* (2006.01)
*H04L 12/24* (2006.01)
*G06F 11/30* (2006.01)
*G06F 11/34* (2006.01)

(52) U.S. Cl.
CPC ...... *G06F 11/3006* (2013.01); *G06F 11/3055* (2013.01); *G06F 11/3452* (2013.01); *G06F 11/3476* (2013.01)

(58) Field of Classification Search
CPC ............. G06F 11/3006; G06F 11/3055; G06F 11/3452; G06F 11/3476; H04L 41/0631; H04L 41/065; H04L 41/064; H04L 43/08
See application file for complete search history.

(56) References Cited

U.S. PATENT DOCUMENTS

2017/0075744 A1    3/2017  Deshpande et al.
2017/0155537 A1*   6/2017  Maheshwari ......... H04L 41/064
2018/0034685 A1    2/2018  Naous et al.
(Continued)

OTHER PUBLICATIONS

Chandola et al. Anomaly Detection: A Survey, V. 2009. ACM Comput. Surv. 41, 3, Article 15 (Jul. 2009), 58 pages. DOI = 10.1145/1541880.1541882. http://doi.acm.org/10.1145/1541880.1541882.

(Continued)

*Primary Examiner* — Wing F Chan
*Assistant Examiner* — Billy H Ng
(74) *Attorney, Agent, or Firm* — Ziv Glazberg

(57) ABSTRACT

A method, computerized apparatus and a computer program product for anomaly detection in a distributed system. The method comprises obtaining measurements of metrics of the distributed system within a timeframe. Each measurement comprises a time-series of values to a metric associated with an action of a component of the distributed system that was measured within the timeframe. A set of percentiles of the measurements is computed, whereby a dimensionality of the sets of percentiles is larger than a dimensionality of the metrics. A multivariate anomaly detection is performed based on the weights of the percentiles to determine an anomaly in the sets of percentiles. In response to detecting an anomaly, a source of the anomaly is identified based on a subset of the percentiles having weights above a threshold, by determining common components or actions that are common to at least a portion of the subset of the percentiles.

18 Claims, 4 Drawing Sheets

(56) References Cited

U.S. PATENT DOCUMENTS

2018/0373580 A1    12/2018   Ertl et al.
2019/0245766 A1*   8/2019   Onoue ................ G06F 11/3495
2020/0236015 A1*   7/2020   Li ........................... H04L 43/08

OTHER PUBLICATIONS

Goldberg et al. The Importance of Features for Statistical Anomaly Detection, 7th USENIX Workshop on Hot Topics in Cloud Computing (HotCloud 15), 2015, Santa Clara, CA, USENIX Association. https://www.usenix.org/system/files/conference/hotcloud15/hotcloud15-goldberg.pdf.

Cheng et al. Detection and Characterization of Anomalies in Multivariate Time Series. 2009, 413-424. 10.1137/1.9781611972795.36.https://doi.org/10.1371/journal.pone.0152173.

Goldstein et al. A Comparative Evaluation of Unsupervised Anomaly Detection Algorithms for Multivariate Data. PLoS One, 2016, 11(4): e0152173. https://doi.org/10.1371/journal.pone.0152173.

Jakobson et al. Alarm Correlation Correlating multiple network alarms improves telecommunications network surveillance and fault management. 1993. Network, IEEE. 7. 52-59. 10.1109/65.244794. https://www.researchgate.net/publication/3282445_Alarm_correlation.

Kliger et al. A Coding Approach to Event Correlation. In: Sethi A.S., Raynaud Y., Faure-Vincent F. (eds) Integrated Network Management IV 1995. IFIP —The International Federation for Information Processing. Springer, Boston, MA.

* cited by examiner

MULTIVARIATE ANOMALY DETECTION AND IDENTIFICATION

TECHNICAL FIELD

The present disclosure relates to multivariate anomaly detection in general, and to multivariate anomaly detection and identification in distributed systems based on percentiles of metrics, in particular.

BACKGROUND

The prevalence of networked sensors and actuators in real-world distributed systems such as smart buildings, factories, power plants, and data centers may generate substantial amounts of multivariate time series data for these systems. Such data may be continuously monitored for intrusion events through anomaly detection. The system may detect anomalies in individual metrics of data. A second layer of machine learning may groups anomalies from related metrics together. However, conventional anomaly detection methods may be inadequate due to the dynamic complexities of these systems, while supervised machine learning methods may be unable to exploit the large amounts of data due to the lack of labeled data.

Multivariate anomaly detection approaches may detect anomalies as complete incidents. Multivariate anomaly detection approaches may consider the entire metric set concurrently to capture the latent interactions amongst the metrics, instead of treating each data stream independently. Multivariate anomaly detection learns a single model for all the metrics in the system instead of looking for anomalies in each individual metric.

BRIEF SUMMARY

One exemplary embodiment of the disclosed subject matter is a method for anomaly detection in a distributed system. The distributed system comprises a plurality of components located on different networked devices. The method comprises obtaining a plurality of time-series measurements of a plurality of metrics of the distributed system within a timeframe. Each time-series measurement comprises a time-series of values to a metric associated with an action of a component of the distributed system that was measured within the timeframe. The method further comprises computing, for each metric, a set of percentiles of the plurality of time-series measurements corresponding to the each metric, whereby a dimensionality of a plurality of the sets of percentiles is larger than a dimensionality of the plurality of metrics. The method further comprises performing a multivariate anomaly detection to determine an anomaly in the plurality of the sets of percentiles. Said performing comprises computing a weight for each percentile in the plurality of the sets of percentiles. The multivariate anomaly detection is based on the weights of the percentiles. In response to detecting an anomaly, identifying a source of the anomaly based on a subset of the percentiles. Each percentile in the subset has a weight above a threshold. Said identifying comprises determining one or more common components or actions that are common to at least a portion of the subset of the percentiles.

Another exemplary embodiment of the disclosed subject matter is a computerized apparatus having a processor, the processor being adapted to perform the steps of: obtaining a plurality of time-series measurements of a plurality of metrics of the distributed system within a timeframe, wherein each time-series measurement comprises a time-series of values to a metric associated with an action of a component of the distributed system that was measured within the timeframe; computing, for each metric, a set of percentiles of the plurality of time-series measurements corresponding to the each metric, whereby a dimensionality of a plurality of the sets of percentiles is larger than a dimensionality of the plurality of metrics; performing a multivariate anomaly detection to determine an anomaly in the plurality of the sets of percentiles, wherein said performing comprises computing a weight for each percentile in the plurality of the sets of percentiles, wherein the multivariate anomaly detection is based on the weights of the percentiles; and in response to detecting an anomaly, identifying a source of the anomaly based on a subset of the percentiles, wherein each percentile in the subset has a weight above a threshold, wherein said identifying comprises determining one or more common components or actions that are common to at least a portion of the subset of the percentiles.

Yet another exemplary embodiment of the disclosed subject matter is a computer program product comprising a non-transitory computer readable storage medium retaining program instructions, which program instructions when read by a processor, cause the processor to perform a method comprising: obtaining a plurality of time-series measurements of a plurality of metrics of the distributed system within a timeframe, wherein each time-series measurement comprises a time-series of values to a metric associated with an action of a component of the distributed system that was measured within the timeframe; computing, for each metric, a set of percentiles of the plurality of time-series measurements corresponding to the each metric, whereby a dimensionality of a plurality of the sets of percentiles is larger than a dimensionality of the plurality of metrics; performing a multivariate anomaly detection to determine an anomaly in the plurality of the sets of percentiles, wherein said performing comprises computing a weight for each percentile in the plurality of the sets of percentiles, wherein the multivariate anomaly detection is based on the weights of the percentiles; and in response to detecting an anomaly, identifying a source of the anomaly based on a subset of the percentiles, wherein each percentile in the subset has a weight above a threshold, wherein said identifying comprises determining one or more common components or actions that are common to at least a portion of the subset of the percentiles.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
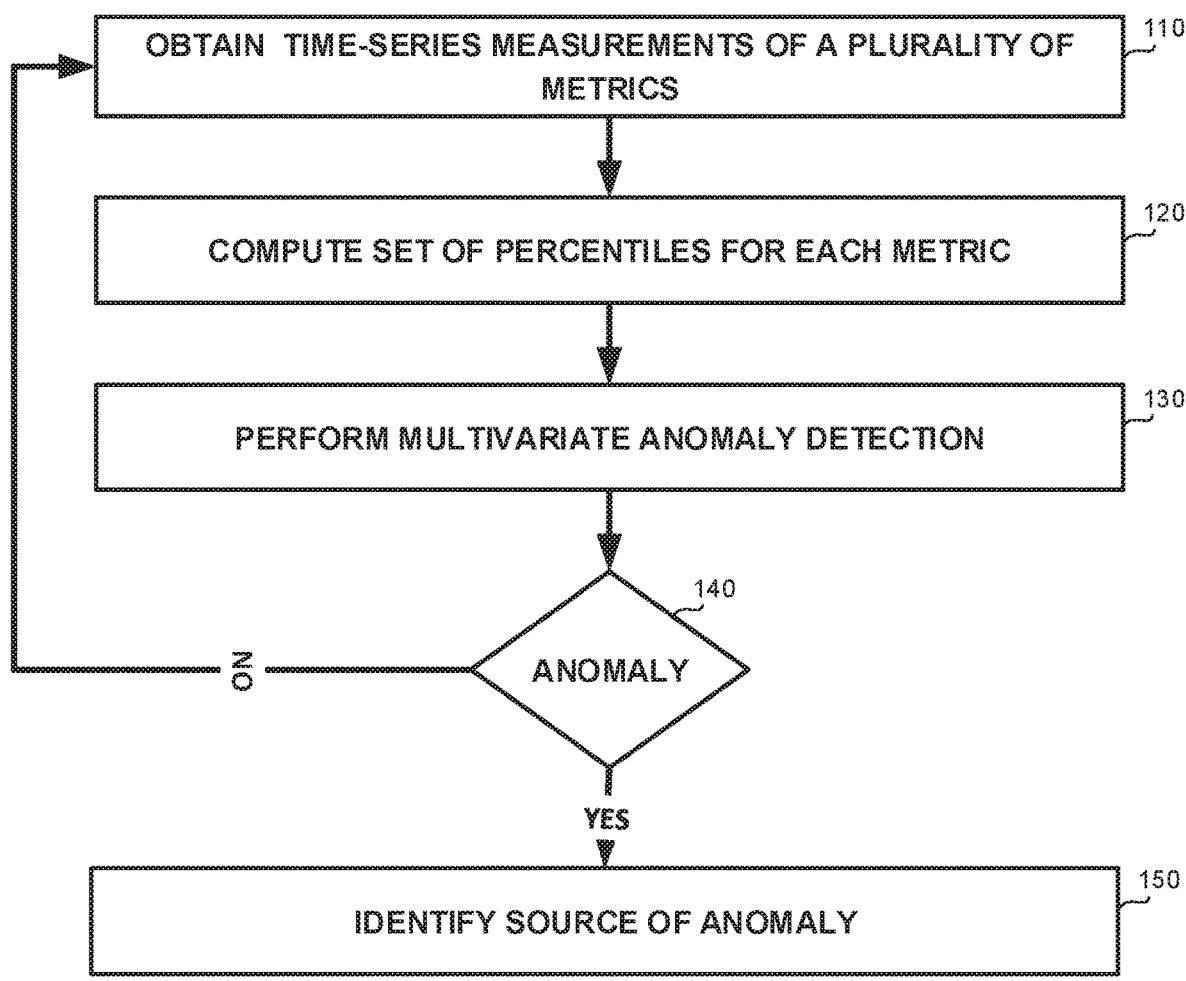
FIGS. 1A-1B show a flowchart diagrams of a method, in accordance with some exemplary embodiments of the disclosed subject matter.

One technical problem dealt with by the disclosed subject matter is to identify root causes of malfunctions and failures in distributed systems.

In some exemplary embodiments, distributed systems may comprise multiple components that may produce different kinds of time series metrics, such as: latency, temperature, CPU utilization, throughput, or the like. System operators may need to analyze these metrics to provide an alert for a misbehaving component. However, since a single metric may have occasional unexpected peaks, an alert provided per a specific metric may usually produce too many false alerts.

In some exemplary embodiments, univariate anomaly detection methods may be utilized. As an example, univariate anomaly detection method may be based on z-score of a single metric such as mean or standard deviation, or the like, based on median or Median Absolute Deviation (MAD), or the like. Additionally or alternatively, multivariate anomaly detection methods may be utilized to reduce unnecessary false alerts. However, applying such anomaly detection methods on the raw metrics, may produce too many alerts to handle and too many data to effectively process. Such approaches may produce anomaly alerts that are hard to interpret because all the metrics may be gathered to generate a single output from the anomaly detection system. Multivariate methods may be hard to scale beyond a few metrics because each added metric may introduce additional interactions between metrics. Since multivariate anomaly detection methods have to model this entire complex system, the computational cost may increase rapidly as the number of modeled metrics increases. Furthermore, the individual metrics may need to have similar statistical behavior for multivariate methods to work accurately.

One technical solution is to prepare features based on percentiles of the raw time series metrics to serve as a preliminary step for multivariate anomaly detection.

In some exemplary embodiments, a time frame for analyzing the metric may be determined. An appropriate time granularity for analysis may be determined based on a granularity of the anomaly reporting as required by a user, based on the availability of the inputs, (e.g., the number of input readings within the timeframe), a minimal amount of data for creating percentiles, or the like. As an example, the time frame may be 30 seconds, one minute, 5 minutes, 10 minutes, or the like. Additionally or alternatively, In some exemplary embodiments, a plurality of percentiles of each metric may be computed for each timeframe. As an example, the plurality of percentiles may comprise the median and several percentiles, such as 1%, 10%, 25%, 75%, 90%, 95%, 99%, or the like. The number of percentiles may be determined to be about 5, about 7, or the like. It may be appreciated that, under the same assumptions, any other reasonable set of percentiles may be selected, since the behavior of any choice of percentiles should be similar.

In some exemplary embodiments, the minimal percentile and the maximal percentile may be selected to be 1% and 99% and to be the minimum and the maximum of the metric readings, in order to avoid a bias in cases of outlier maximal or minimal values with a high deviation. Utilizing such percentiles instead of the other statistical functions such as means or maxima, may be more robust against outliers. Similarly, for is similar statistical analytics use-cases a median value may be utilized instead of the mean. Additional percentiles such as 90%, 95%, 10%, 5%, or the like may be considered to be utilized instead of maximum and minimum respectively maximum and minimum that may be less sensitive to outliers.

In some exemplary embodiments, multiple percentiles of the same metric may be computed in parallel using a Map/Reduce framework, such as Apache Spark. As an example, Apache Sparks function "percentile_approx" may be applied to calculate the percentiles efficiently. Additionally or alternatively, percentiles of different metrics may be computed in parallel.

In some exemplary embodiments, a multivariate anomaly detection may be applied on the pre-calculated percentiles to compute the anomaly score. As an example, the percentiles may serve as inputs for neural networks such as Long Short-Term Memory (LSTM) network, a basic outlier detection algorithm implementation based on z-scores, or the like. The cause of the anomaly may be detected and analyzed to focus on the problematic component.

It may be noted that a dimensionality of the generated percentiles may be greater than a dimensionality of the metrics. In some exemplary embodiments, utilizing several percentiles of the same metric may be counter-intuitive, since time-series data of the same metric may be expected to be correlated in anomaly detection. Nevertheless, utilizing multiple percentiles of the same metric may be we argue beneficial in order to detect anomalies and reveal their root-cause in the certain cases. As an example, when a component is misbehaving (e.g., fails or is failing), all the percentiles may be expected to indicate anomalous behavior. As a result, the multivariate anomaly detection tool may get as an input many anomalous features, and this in turn may result in a high anomaly score. Such result may will allow isolating the cause of the anomaly and focus on the failed component. As another example, it may be expected that the percentiles of the same metric should be correlated, and therefore a correlation breakdown of different percentiles calculated from the same metric may usually indicate an anomaly. Several correlation breakdowns of the same component may provide an indication for an anomalous behavior of the component.

One technical effect of utilizing the disclosed subject matter is providing for an easier and more efficient anomaly detection, especially in metrics with irregular distribution. Utilizing percentiles instead of the original metrics may be more effective for anomaly detection as the original metrics, such as latency, temperature, or the like may have an irregular distribution, such as multi-modal, long-tail, or the like. While, due to the Central Limit Theorem for medians and other quantiles, a median or a specific percentile of a sufficiently large subset taken from this distribution may approximately be normally distributed, thus allowing us to use methods such as z-scores.

Another technical effect of utilizing the disclosed subject matter is to provide more accurate anomaly detection in distributed systems. Multivariate anomaly detection methods may comprise a preliminary step of reducing the dimension of the problem by performing Principle Component Analysis (PCA), thus removing unnecessary correlations. Such step may eliminate many features that may be related to the source of the anomaly, such as because of utilizing different actions by different components, thereby providing different types of measurements, or the like. In contrast, the disclosed subject matter may not only avoid reducing the dimensionality of the problem, but may also use several percentiles of the same metric, thus increases the dimensionality of the problem since such percentiles may be expected to be correlated. Utilizing multiple percentiles of the same metric in order to detect anomalies may be more efficient to reveal the root-causes of the anomaly, as when a component is misbehaving (e.g., fails or is failing), then all the percentiles may be expected to indicate anomalous behavior. As the percentiles of the same metric may be correlated, a correlation breakdown of different percentiles calculated from the same metric may usually indicate an anomaly.

It may be appreciated that a person of an ordinary skill in the art would be motivated to decrease the dimensional subspace in which anomaly detection is performed, and not increasing the dimensional subspace as the disclosed herein. (See for example Chandola, V., Banerjee, A., and Kumar, V. 2009. Anomaly detection: A survey. ACM Comput. Surv. 41, 3, Article 15 (July 2009), 58 pages; or Goldstein M, Uchida S (2016), A Comparative Evaluation of Unsupervised Anomaly Detection Algorithms for Multivariate Data. As a result, the art teaches away from the disclosed subject matter.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, time-series measurements of a plurality of metrics of a distributed system within a timeframe may be obtained. In some exemplary embodiments, the distributed system may comprise a plurality of components located on different networked devices. The plurality of components may communicate and coordinate their actions by passing messages to one another. The plurality of components may interact with one another in order to achieve a common goal. In some exemplary embodiments, each time-series measurement may comprise a time-series of values to a metric associated with an action of a component that was measured within the timeframe. Each component of the distributed system may be configured to perform multiple actions, each of which may produce or may be measured through different metrics, such as latency, temperature, CPU utilization, throughput, or the like. Such metrics may be time series metrics comprising a series of numeric data points of a particular metric over time.

On Step 120, a set of percentiles of the plurality of time-series measurements corresponding to the metric may be computed for each metric. In some exemplary embodiments, a dimensionality of a plurality of the sets of percentiles may be greater than a dimensionality of the plurality of metrics. In some exemplary embodiments, the set of percentiles may comprise a percentile that is an approximation of a minimal value, such as 1%, 5%, or the like; and a percentile that is an approximation percentile is an approximation of a maximal value, such as 95%, 99% or the like. Such percentiles may be more robust than maximum and minimum values that may be highly sensitive to outliers. Furthermore, a median value may be utilized as an approximation of a mean value, as a median function may also be more robust against outliers than a mean function.

Additionally or alternatively, any other set of percentiles comprising at least five percentiles, such as normally distributed percentiles may be utilized. As an example, the set of percentiles may comprise an about 1% percentile, an about 10% percentile, an is about 25% percentile, an about 75% percentile, an about 90% percentile, and an about 99% percentile.

On Step 130, a multivariate anomaly detection may be performed in order to determine an anomaly in the plurality of the sets of percentiles. In some exemplary embodiments, the multivariate anomaly detection may be performed to identify rare items in the time-series measurements which raise suspicions by differing significantly from the majority of the data.

In some exemplary embodiments, the multivariate anomaly detection is based on the weights of the percentiles. A weight may be computed for each percentile in the plurality of the sets of percentiles. As an example, the weights may be z-scores of the set of percentiles.

On Step 140, a determination whether an anomaly is detected may be performed. In response to detecting an anomaly, Step 150 may be performed. In response to not detecting an anomaly, Step 110 may be repeated with time series measurements from the successive timeframe.

On Step 150, a source of the anomaly may be identified. In some exemplary embodiments, a subset of the percentiles each of a weight above a predetermined threshold may be determined. The source may be identified by determining one or more common components or actions that are common to at least a portion of the subset of the percentiles. As an example, a subset of predetermined number of percentiles with the highest weights may be considered. Additionally or alternatively, the threshold may be computed based on previous anomaly scores of preceding timeframes.

Figure 1B:
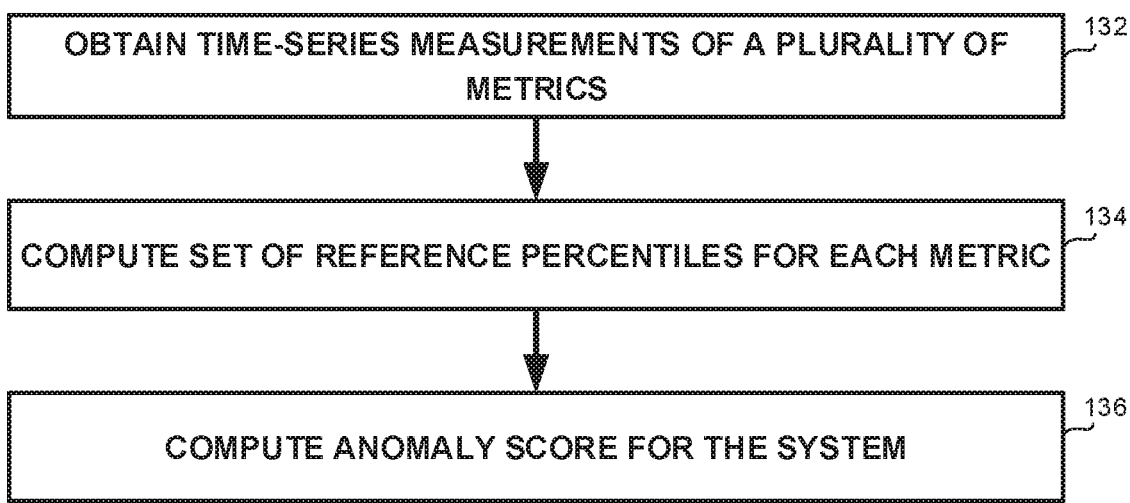

Referring now to FIG. 1B showing a flowchart diagram of a method, in accordance with some exemplary embodiments of the disclosed subject matter.

On Step 132, a plurality of reference time-series measurements of the plurality of metrics of the distributed system within a reference timeframe may be obtained. In some exemplary embodiments, the reference timeframe may comprise a plurality of sub-timeframes. Each sub-timeframe may be of the same duration as the time reference investigated on Step 110 of FIG. 1A.

On Step 134, a set of reference percentiles of the plurality of reference time-series measurements for each metric in the sub-timeframe may be computed. A set of reference percentiles may be computed for each sub-timeframe may be computed as described in Step 120 of FIG. 1A.

On Step 136, an anomaly score for the distributed system at the timeframe may be computed. In some exemplary embodiments, the anomaly score may be computed based on a plurality of sets of reference percentiles and based on the plurality of the sets of percentiles, such as an average, a mean, or the like of the anomaly score may be computed based on a plurality of sets of reference percentiles. Additionally or alternatively, a threshold for determining the anomaly may be computed based on the anomaly scores of the plurality of sets of reference percentiles.

As an example, a plurality of anomaly scores of the plurality of reference time-series measurements of the plurality of metrics of the distributed system may be computed for about two weeks, about a month, or the like. A mean (referred to as M) and a standard deviation (referred to as S) may be calculated over the plurality of anomaly scores. The threshold may be computed based on the mean and the standard deviation of the plurality of anomaly scores, such as M+3S.

Figure 2:
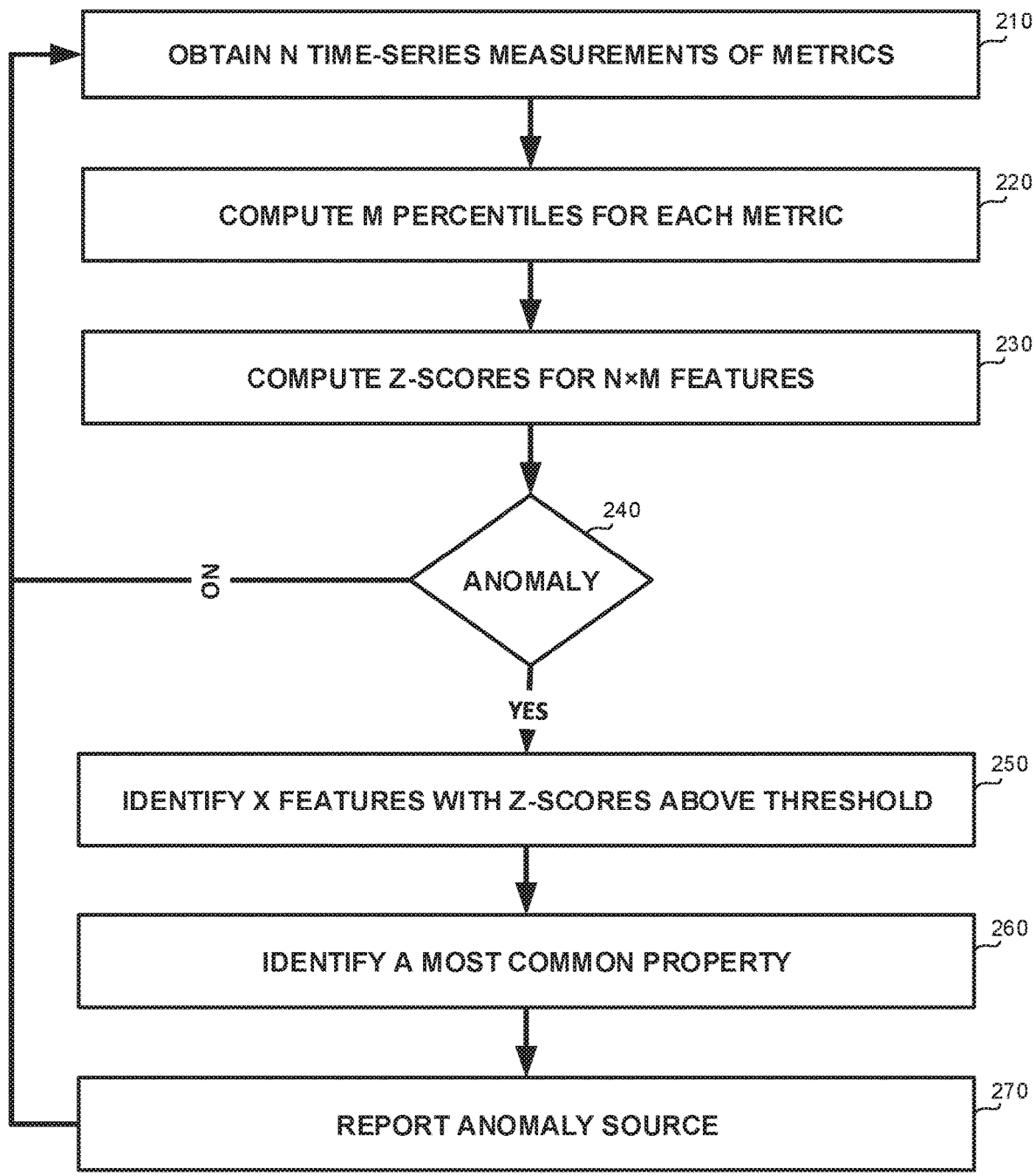
FIG. 2 shows a flowchart diagrams of a method, in accordance with some exemplary embodiments of the disclosed subject matter.

Referring now to FIG. 2 showing a flowchart diagram of a method, in accordance with some exemplary embodiments of the disclosed subject matter.

On Step 210, N time-series measurements of a plurality of metrics of a distributed system within a timeframe may be obtained. In some exemplary embodiments, the N time-series measurements may be observed over a plurality of components of the distributed system. The N time-series measurements may comprise N time-series of values to N metrics associated with actions of the components.

On Step 220, a set of M percentiles may be computed for each metric may be computed over the plurality of time-series measurements. In some exemplary embodiments, N×M percentiles may be generated over the N time-series measurements. Each percentile may be provided as a feature for anomaly detection. As a result, a dimensionality of the generated features (e.g., the N×M percentiles) may be greater than a dimensionality of the original features (e.g., the N of metrics).

It may be noted that multivariate anomaly detection methods may usually include a preliminary step of reducing the dimension of the problem by performing PCA to remove unnecessary correlations. However, in Step 220, instead of reducing the dimension of the problem, the dimension may be increased by M times. Furthermore, it may be counter-intuitive comparing to regular methods to use several percentiles of the same metric, since they are expected to be correlated. However, in the disclosed method, it may actually be beneficial to use multiple percentiles of the same metric in order to detect anomalies and reveal their root-cause.

On Step 230, z-scores may be computed for the N×M features. In some exemplary embodiments, z-score may be a fractional number of standard deviations by which the value of an observation or data point is above the mean value of what is being observed or measured. The z-score may be calculated by subtracting the mean of an individual raw score and then dividing the difference by the standard deviation. It may be noted that despite that the original metrics (such as latency, temperature or the like) may have an irregular distribution such as multi-modal, long-tail, or the like; the percentiles thereof may have a normal distribution. Based on the Central Limit Theorem for medians and other quantiles, it holds that a median or a specific percentile of a sufficiently large subset taken from this distribution will approximately be normally distributed. As a result, z-scores may be possible to be utilized.

In some exemplary embodiments, a time-window of past data may be selected for computing the z-scores. As an example, the time-window may be 12 hours, 24 hours, 45 hours, same daily range of hours during the previous week, or the like. Mean μ and standard deviation σ of each feature column during the time window may be calculated to compute the z-scores. The z-score of each new row of features $(x_1, \ldots, x_n)$:

$$z_i = \frac{x_i - \mu_i}{\sigma_i}.$$

In some exemplary embodiments, the anomaly score may be Euclidean norm of all z-scores: $Z_T = \sqrt{z_1^2 + \ldots + z_n^2}$.

On Step 240, a determination whether an anomaly is detected may be performed. In some exemplary embodiments, an anomaly detection algorithm may be applied.

In some exemplary embodiments, an anomaly threshold may be computed based on anomaly scores in a reference time window. As an example, all $Z_T$ for the last two weeks, last month, or the like, may be computed. The anomaly threshold may be computed based thereon. As an example, the anomaly threshold may be M+3S, where M is the mean of the reference anomaly scores and S is the standard deviation thereof. Features with z-score above this threshold may be determined to represent anomaly.

In response to detecting an anomaly, Step 250 may be performed. In response to not detecting an anomaly, Step 210 may be repeated with time series measurements from the successive timeframe.

On Step 250, X features with z-scores above a threshold may be identified. In some exemplary embodiments, X may be provided as input from a user. Additionally or alternatively, X may be determined based on the total number of percentiles, such as about 1% of the percentiles, 5%, 10%, or the like.

It may be noted that when a component is misbehaving (e.g., fails or is failing), all the percentiles associated therewith may be expected to indicate anomalous behavior. As a result, percentiles of the same metric may be correlated, and therefore a correlation breakdown of different percentiles calculated from the same metric may usually indicate an anomaly.

On Step 260, a most common property may be identified. In some exemplary embodiments, the most common property in the X features with z-scores above the threshold may be isolated. A component or an action related to the most common property may be identified and determined to be an anomaly source.

On Step 270, anomaly source may be reported. In some exemplary embodiments, the anomaly source may be reported to an operator of the distributed system, to users, to networked devices the components are distributed thereon, or the like.

Figure 3:
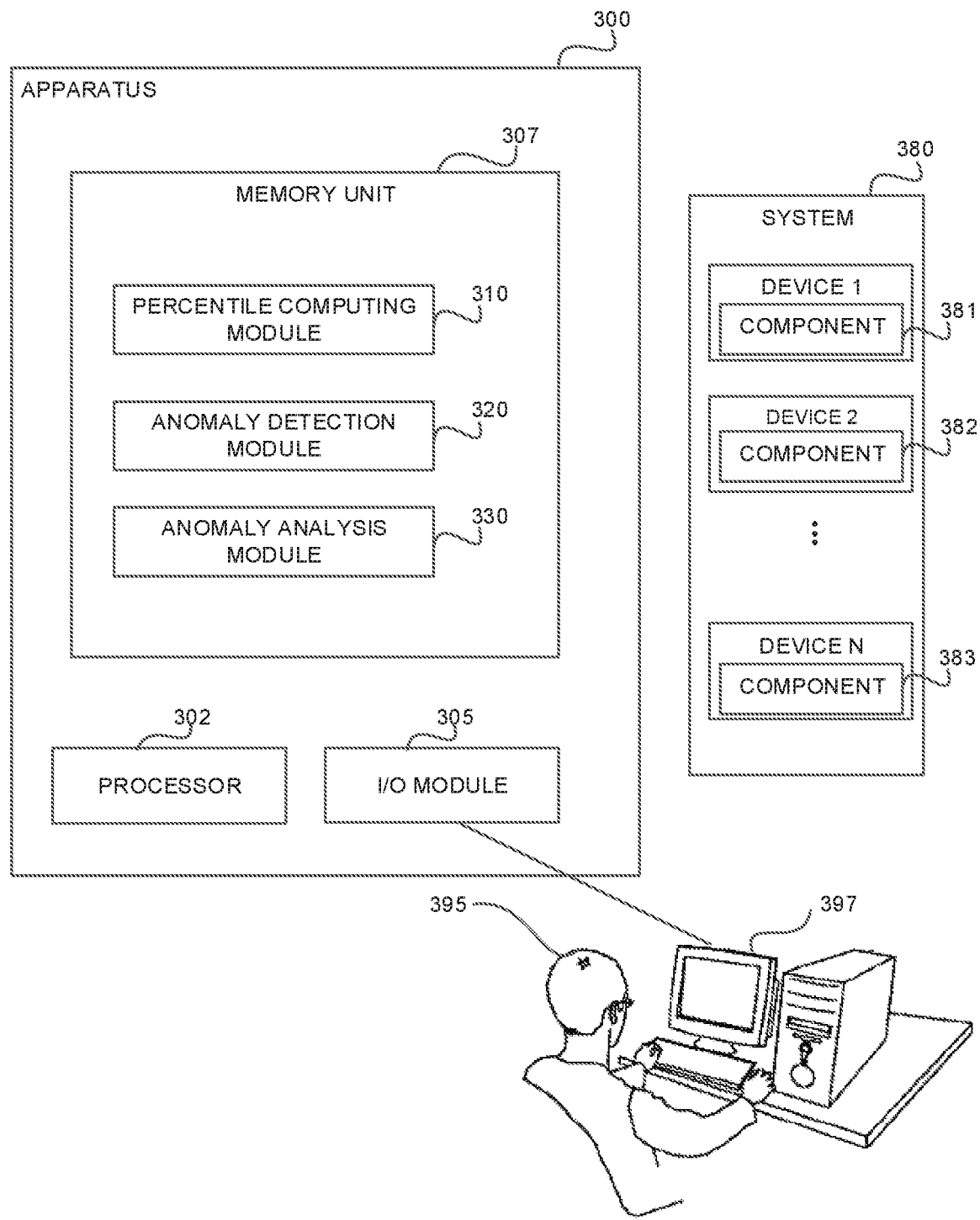
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 200 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments, Apparatus 300 may be utilized for anomaly detection in a Distributed System 380. Distributed System 380 may comprise a plurality of Components (381, 382-383) located on different networked devices.

In some exemplary embodiments of the disclosed subject matter, Apparatus 300 may comprise an Input/Output (I/O) module 305. I/O Module 305 may be utilized to provide an output to the user, such as reporting anomaly sources, and receive input from a user, such as, for example thresholds, time series data, or the like.

In some exemplary embodiments, I/O Module 305 may be utilized to obtain time-series measurements of a plurality of metrics of Distributed System 380 within a timeframe. Each time-series measurement may comprise a time-series of values to a metric associated with an action of a Component (381-383) of Distributed System 380 that was measured within the timeframe. Additionally or alternatively, I/O Module 305 may be utilized to obtain a plurality of reference time-series measurements of the plurality of metrics of Distributed System 380 within a reference timeframe comprising a plurality of sub-timeframes having the duration;

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Percentile Computing Module 310 may be configured to compute, for each metric, a set of percentiles of the plurality of time-series measurements corresponding to the each metric. Percentile Computing Module 310 may be configured to compute at least five percentiles. Percentile Computing Module 310 may be configured to compute at least a first percentile, a second percentile and a third percentile. The first percentile may be an approximation of a minimal value, the second percentile may be an approximation of a mean value, and the third percentile may be an approximation of a maximal value. Additionally or alternatively, the set of percentiles comprise at least one of: an about 1% percentile, an about 10% percentile, an about 25% percentile, an about 75% percentile, an about 90% percentile, an about 99% percentile, or the like.

In some exemplary embodiments, Percentile Computing Module 310 may efficiently generate many percentiles of the same metric in parallel using a Map/Reduce framework (such as Apache Spark™). As an example, Percentile Computing Module 310 may be configured to us Apache Sparks function "percentile_approx" to calculate the percentiles efficiently. Additionally or alternatively, Percentile Computing Module 310 may configured to computed the percentiles of multiple metrics in parallel.

Additionally or alternatively, Percentile Computing Module 310 may be configured to compute, for each metric and for each sub-timeframe, a set of reference percentiles of the plurality of reference time-series measurements corresponding to the each metric in the sub-timeframe of the reference timeframe.

In some exemplary embodiments, Anomaly Detection Module 320 may be configured to perform a multivariate anomaly detection to determine an anomaly in the plurality of the sets of percentiles. Anomaly Detection Module 320 may be configured to compute a weight for each percentile in the plurality of the sets of percentiles. The multivariate anomaly detection may be performed based on the weights of the percentiles, such as z-scores. Anomaly Detection Module 320 may be configured to perform the multivariate anomaly detection based on z-scores of the set of percentiles. Anomaly Detection Module 320 may be configured to utilize a multivariate anomaly detection algorithm on the percentiles.

In some exemplary embodiments, Anomaly Detection Module 320 may be configured to compute a threshold for determining an anomaly. Anomaly Detection Module 320 may be configured to compute an anomaly score for Distributed System 380 at the timeframe based on the plurality of sets of reference percentiles computed for the reference timeframe and based on the plurality of the sets of percentiles. As an example, the threshold may be an Euclidean norm of the anomaly scores of the reference timeframe percentiles.

In some exemplary embodiments, Anomaly Analysis Module 330 may be configured to identify a source of the anomaly in response to Anomaly Detection Module 320 detecting an anomaly. Anomaly Analysis Module 330 may be configured to identify a subset of the percentiles, having a weight above a threshold. Anomaly Analysis Module 330 may be configured to determine one or more common components or actions that are common to at least a portion of the subset of the percentiles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for anomaly detection in a distributed system, wherein the distributed system comprises a plurality of components located on different networked devices, the method comprising:
    obtaining a plurality of time-series measurements of a plurality of metrics of the distributed system within a timeframe, wherein each time-series measurement comprises a time-series of values to a metric associated with an action of a component of the distributed system that was measured within the timeframe;
    computing, for each metric, a set of percentiles of the plurality of time-series measurements corresponding to the each metric, wherein the set of percentiles comprises a plurality of percentiles of the each metric for each timeframe, whereby a dimensionality of a plurality of the sets of percentiles is larger than a dimensionality of the plurality of metrics;
    performing a multivariate anomaly detection to determine an anomaly in the plurality of the sets of percentiles, wherein said performing comprises computing a weight for each percentile in the plurality of the sets of percentiles, wherein the multivariate anomaly detection is based on the weights of the percentiles; and
    in response to detecting an anomaly, identifying a source of the anomaly based on a subset of the percentiles, wherein each percentile in the subset has a weight above a threshold, wherein said identifying comprises determining one or more common components or actions that are common to at least a portion of the subset of the percentiles.

2. The method of claim 1,
    wherein the timeframe has a duration;
    wherein said performing the multivariate anomaly detection comprises:
        obtaining a plurality of reference time-series measurements of the plurality of metrics of the distributed system within a reference timeframe, wherein the reference timeframe comprises a plurality of sub-timeframes having the duration;

computing, for each metric and for each sub-timeframe, a set of reference percentiles of the plurality of reference time-series measurements corresponding to the each metric in the sub-timeframe;

computing an anomaly score for the distributed system at the timeframe based on a plurality of sets of reference percentiles and based on the plurality of the sets of percentiles.

3. The method of claim 1, wherein said performing the multivariate anomaly detection is performed based on z-scores of the set of percentiles, wherein the weights are z-scores of the percentiles.

4. The method of claim 1, wherein the set of percentiles comprises at least a first percentile, a second percentile and a third percentile, wherein the first percentile is an approximation of a minimal value, wherein the second percentile is an approximation of a mean value, wherein the third percentile is an approximation of a maximal value.

5. The method of claim 1, wherein the set of percentiles comprise at least one of:
a 1% percentile;
a 10% percentile;
a 25% percentile;
a 75% percentile;
a 90% percentile; and
a 99% percentile.

6. The method of claim 1, wherein the set of percentiles comprise at least five different percentiles.

7. A computerized apparatus having a processor, the processor being adapted to perform the steps of:
obtaining a plurality of time-series measurements of a plurality of metrics of the distributed system within a timeframe, wherein each time-series measurement comprises a time-series of values to a metric associated with an action of a component of the distributed system that was measured within the timeframe;
computing, for each metric, a set of percentiles of the plurality of time-series measurements corresponding to the each metric, wherein the set of percentiles comprises a plurality of percentiles of the each metric for each timeframe, whereby a dimensionality of a plurality of the sets of percentiles is larger than a dimensionality of the plurality of metrics;
performing a multivariate anomaly detection to determine an anomaly in the plurality of the sets of percentiles, wherein said performing comprises computing a weight for each percentile in the plurality of the sets of percentiles, wherein the multivariate anomaly detection is based on the weights of the percentiles; and
in response to detecting an anomaly, identifying a source of the anomaly based on a subset of the percentiles, wherein each percentile in the subset has a weight above a threshold, wherein said identifying comprises determining one or more common components or actions that are common to at least a portion of the subset of the percentiles.

8. The computerized apparatus of claim 7,
wherein the timeframe has a duration;
wherein said performing the multivariate anomaly detection comprises:
obtaining a plurality of reference time-series measurements of the plurality of metrics of the distributed system within a reference timeframe, wherein the reference timeframe comprises a plurality of sub-timeframes having the duration;
computing, for each metric and for each sub-timeframe, a set of reference percentiles of the plurality of reference time-series measurements corresponding to the each metric in the sub-timeframe;
computing an anomaly score for the distributed system at the timeframe based on a plurality of sets of reference percentiles and based on the plurality of the sets of percentiles.

9. The computerized apparatus of claim 7, wherein said performing the multivariate anomaly detection is performed based on z-scores of the set of percentiles, wherein the weights are z-scores of the percentiles.

10. The computerized apparatus of claim 7, wherein the set of percentiles comprises at least a first percentile, a second percentile and a third percentile, wherein the first percentile is an approximation of a minimal value, wherein the second percentile is an approximation of a mean value, wherein the third percentile is an approximation of a maximal value.

11. The computerized apparatus of claim 7, wherein the set of percentiles comprise at least one of:
a 1% percentile;
a 10% percentile;
a 25% percentile;
a 75% percentile;
a 90% percentile; and
a 99% percentile.

12. The computerized apparatus of claim 7, wherein the set of percentiles comprise at least five different percentiles.

13. A computer program product comprising a non-transitory computer readable storage medium retaining program instructions, which program instructions when read by a processor, cause the processor to perform a method comprising:
obtaining a plurality of time-series measurements of a plurality of metrics of the distributed system within a timeframe, wherein each time-series measurement comprises a time-series of values to a metric associated with an action of a component of the distributed system that was measured within the timeframe;
computing, for each metric, a set of percentiles of the plurality of time-series measurements corresponding to the each metric, wherein the set of percentiles comprises a plurality of percentiles of the each metric for each timeframe, whereby a dimensionality of a plurality of the sets of percentiles is larger than a dimensionality of the plurality of metrics;
performing a multivariate anomaly detection to determine an anomaly in the plurality of the sets of percentiles, wherein said performing comprises computing a weight for each percentile in the plurality of the sets of percentiles, wherein the multivariate anomaly detection is based on the weights of the percentiles; and
in response to detecting an anomaly, identifying a source of the anomaly based on a subset of the percentiles, wherein each percentile in the subset has a weight above a threshold, wherein said identifying comprises determining one or more common components or actions that are common to at least a portion of the subset of the percentiles.

14. The computer program product of claim 13,
wherein the timeframe has a duration;
wherein said performing the multivariate anomaly detection comprises:
obtaining a plurality of reference time-series measurements of the plurality of metrics of the distributed system within a reference timeframe, wherein the reference timeframe comprises a plurality of sub-timeframes having the duration;

computing, for each metric and for each sub-timeframe, a set of reference percentiles of the plurality of reference time-series measurements corresponding to the each metric in the sub-timeframe;

computing an anomaly score for the distributed system at the timeframe based on a plurality of sets of reference percentiles and based on the plurality of the sets of percentiles.

15. The computer program product of claim 13, wherein said performing the multivariate anomaly detection is performed based on z-scores of the set of percentiles, wherein the weights are z-scores of the percentiles.

16. The computer program product of claim 13, wherein the set of percentiles comprises at least a first percentile, a second percentile and a third percentile, wherein the first percentile is an approximation of a minimal value, wherein the second percentile is an approximation of a mean value, wherein the third percentile is an approximation of a maximal value.

17. The computer program product of claim 13, wherein the set of percentiles comprise at least one of:
  a 1% percentile;
  a 10% percentile;
  a 25% percentile;
  a 75% percentile;
  a 90% percentile; and
  a 99% percentile.

18. The computer program product of claim 13, wherein the set of percentiles comprise at least five different percentiles.

* * * * *